United States Patent
Buccapatnam Tirumala et al.

(10) Patent No.: US 10,679,136 B2
(45) Date of Patent: Jun. 9, 2020

(54) DECISION PROCESSING AND INFORMATION SHARING IN DISTRIBUTED COMPUTING ENVIRONMENT

(71) Applicant: International Business Machines Corporation, Armonk, NY (US)

(72) Inventors: Swapna Buccapatnam Tirumala, Princeton, NJ (US); Jian Tan, Wappingers Falls, NY (US); Li Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 791 days.

(21) Appl. No.: 14/694,326

(22) Filed: Apr. 23, 2015

(65) Prior Publication Data

US 2016/0314402 A1 Oct. 27, 2016

(51) Int. Cl.
| | |
|---|---|
| G06N 7/00 | (2006.01) |
| G06F 9/44 | (2018.01) |
| G06F 9/445 | (2018.01) |
| G06N 3/00 | (2006.01) |
| H04L 12/24 | (2006.01) |
| G06N 20/00 | (2019.01) |

(52) U.S. Cl.
CPC .............. G06N 7/005 (2013.01); G06F 9/44 (2013.01); G06F 9/445 (2013.01); G06N 3/006 (2013.01); G06N 20/00 (2019.01); H04L 41/12 (2013.01)

(58) Field of Classification Search
CPC .......... G06N 7/005; G06N 5/043; G06F 9/44; G06F 9/445
USPC ........................................................ 706/52
See application file for complete search history.

(56) References Cited

U.S. PATENT DOCUMENTS 6,564,258 B1 * 5/2003 Uniacke ................. H04L 45/02
370/351
8,321,561 B2 11/2012 Fujita et al.
(Continued)

OTHER PUBLICATIONS

Tran, Hai Anh, et al. "QoE-based server selection for content distribution networks." IEEE Transactions on Computers 63.11 (2014): 2803-2815. (Year: 2014).*
(Continued)

*Primary Examiner* — Vincent Gonzales
*Assistant Examiner* — Kevin W Figueroa
(74) *Attorney, Agent, or Firm* — Anthony Curro; Ryan, Mason & Lewis, LLP

(57) ABSTRACT

A request arrival rate is obtained at a given computing node in a computing network comprising a plurality of distributed computing nodes. A topology of the computing network is determined at the given computing node so as to identify neighboring computing nodes with respect to the given computing node. A probability is computed at the given computing node based on the obtained request arrival rate and the detected network topology. The computed probability is used to select a decision from a set of decision candidates in response to a request received at the given computing node in a given time slot. The selected decision is a decision with a top average reward attributed thereto across the given computing node and the neighboring computing nodes determined based on information shared by the neighboring computing node with the given computing node.

20 Claims, 4 Drawing Sheets

(56) References Cited

U.S. PATENT DOCUMENTS

| | | | |
|---|---|---|---|
| 8,495,157 B2 | 7/2013 | Goodrow et al. | |
| 8,555,287 B2* | 10/2013 | Ding | G06F 9/505 718/102 |
| 2014/0222726 A1 | 8/2014 | Mermoud et al. | |
| 2015/0012345 A1* | 1/2015 | Bhagat | G06Q 30/0214 705/14.16 |
| 2015/0199715 A1* | 7/2015 | Caron | G06Q 30/0241 705/14.52 |
| 2016/0026918 A1* | 1/2016 | Barbieri | G06N 99/005 706/11 |
| 2016/0132787 A1* | 5/2016 | Drevo | G06N 99/005 706/12 |

OTHER PUBLICATIONS

P. Auer et al., "Finite-Time Analysis of the Multiarmed Bandit Problem," Machine Learning, May 2002, pp. 235-256, vol. 47, Nos. 2-3.

E. Hillel et al., "Distributed Exploration in Multi-Armed Bandits," Advances in Neural Information Processing Systems (NIPS), Nov. 2013, pp. 854-862.

B. Szörényi et al., "Gossip-Based Distributed Stochastic Bandit Algorithms," Proceedings of the 30th International Conference on Machine Learning (ICML), Jun. 2013, pp. 19-27, vol. 28.

S. Kar et al., "Bandit Problems in Networks: Asymptotically Efficient Distributed Allocation Rules," 50th IEEE Conference on Decision and Control and European Control Conference (CDC-ECC), Dec. 2011, pp. 1771-1778.

L. Li et al., "A Contextual-Bandit Approach to Personalized News Article Recommendation," Proceedings of the 19th International Conference on World Wide Web (WWW), Apr. 2010, pp. 661-670.

T.L. Lai et al., "Asymptotically Efficient Adaptive Allocation Rules," Advances in Applied Mathematics, Mar. 1985, pp. 4-22, vol. 5, No. 1.

A. Anandkumar et al., "Distributed Algorithms for Learning and Cognitive Medium Access with Logarithmic Regret," IEEE Journal on Selected Areas in Communications, Apr. 2011, pp. 731-745, vol. 29, No. 4.

K. Liu et al., "Distributed Learning in Multi-Armed Bandit with Multiple Players," IEEE Transactions on Signal Processing, Nov. 2010, pp. 5667-5681, vol. 58, No. 11.

R. Agrawal, "Sample Mean Based Index Policies with o(log n) Regret for the Multi-Armed Bandit Problem," Advances in Applied Mathematics, 1995, pp. 1054-1078, vol. 27, No. 4.

\* cited by examiner

| Algorithm : $\epsilon_t$ - greedy for player $i$ |
|---|
| Input: $c > 0, 0 < d < 1, 0 \leq z_i \leq 1$.<br>for each time $t$, upon receiving a request do<br><br>$\quad$ Let $\epsilon_i(t) = \min\left(1, \dfrac{cMz_i}{d^2 t}\right)$.<br><br>$\quad$ Let $a_i^* = \arg\max_{a \in M} \bar{x}_{ia}(t)$,<br><br>$\quad$ where $\bar{x}_{ia}(t)$ is the sample mean of observations available for action $a$ for player $i$ up to time $t$.<br><br>$\quad$ Choose $u$ uniformly at random from $[0,1]$.<br>$\quad$ If $u \leq (1 - \epsilon_i(t))$ : pick action $\phi_i(t) = a_i^*$<br>$\quad$ Else, pick action $\phi_i(t)$ uniformly at random from $M$ and communicate the reward and action to all other players.<br>$\quad$ Update sample means $\bar{x}_{ia}(t+1)$ according to the received/communicated rewards.<br>end for |

DECISION PROCESSING AND INFORMATION SHARING IN DISTRIBUTED COMPUTING ENVIRONMENT

FIELD

The present application relates to computing environments, and more particularly to decision processing and information sharing in such computing environments.

BACKGROUND

Many computing problems can be modeled as sequential decision problems where a policy must choose an action from a set of discrete actions at each time. The reward from this action is random and the statistics of the actions are unknown. These sequential decision problems are called "multi-armed bandit problems" and the actions are referred to as "arms" selected by "players," borrowing from terminology associated with slot machines.

SUMMARY

Embodiments of the invention provide techniques for decision processing and information sharing in a distributed implementation.

For example, in one embodiment, a method comprises the following steps. A request arrival rate is obtained at a given computing node in a computing network comprising a plurality of distributed computing nodes. A topology of the computing network is determined at the given computing node so as to identify neighboring computing nodes with respect to the given computing node. A probability is computed at the given computing node based on the obtained request arrival rate and the detected network topology. The computed probability is used to select a decision from a set of decision candidates in response to a request received at the given computing node in a given time slot. The selected decision is a decision with a top average reward attributed thereto across the given computing node and the neighboring computing nodes determined based on information shared by the neighboring computing node with the given computing node.

The method may further comprise using the computed probability to test a decision from the set of decision candidates in response to the request received at the given computing node in the given time slot. Still further, the method may comprise sending the selected decision and reward attributable thereto from the given computing node to the neighboring computing nodes. A change to at least one of the obtained request arrival rate and the detected network topology may also be detected, and the probability is re-computed based on the detected change.

Advantageously, illustrative embodiments provide for solving sequential decision problems under uncertainty while providing performance improvement as well as communication cost reduction.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 4 illustrates an algorithm for use in the methodology of FIG. 3.

DETAILED DESCRIPTION

Figure 1:
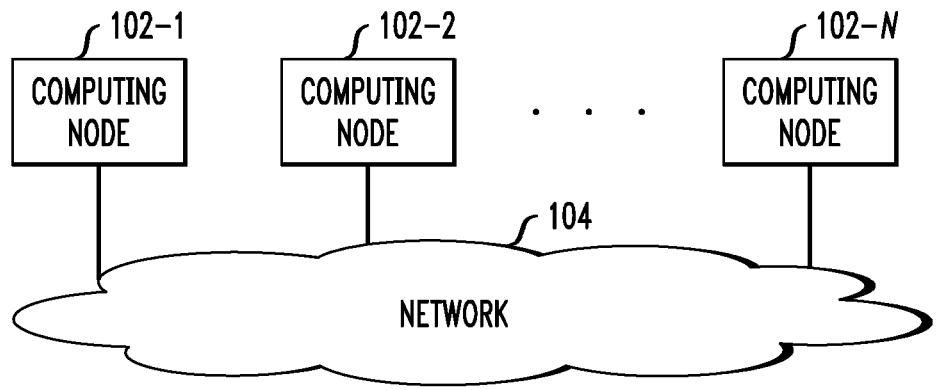
FIG. 1 illustrates a computing network according to an embodiment of the invention.

It is to be appreciated that the invention is not limited to the specific methods illustratively shown and described herein. Rather, embodiments of the invention are directed more broadly to techniques for decision making and information sharing in a distributed computing network.

As will be explained in detail herein, illustrative embodiments balance between exploiting the action that yields the best reward so far with exploring to learn the rewards of all actions. It is realized herein that the computing network that implements a policy for a sequential decision problem, when such computing network is distributed (nodes of the computing network are remote, geographically or otherwise, from each other), needs to deal with communication cost issues. That is, while there may be N nodes, each facing the same sequential decision problem, they can each leverage the other nodes' learning/exploration via communication between the nodes. Illustrative embodiments provide techniques for leveraging such observations.

Multi-armed bandit (MAB) problems model the process of making sequential decisions for reward maximization under uncertainty. In the classical MAB setting, a "player" (computing node) must choose an action at each time from a set of M actions. Choosing an action a at time t gives a random reward $X_a(t)$ drawn from an unknown probability distribution parametrized by action a. The regret of any policy used by the player is defined as the difference between the total reward obtained from the action with the highest average reward and the given policy's accumulated reward. The goal is to find policies that minimize the expected regret over a given time horizon. Since the rewards from each action are drawn from an unknown distribution, the player needs to balance between exploiting the action that yields the best payoffs so far and exploring new actions that may give even higher payoffs later.

Illustrative embodiments address the setting of a time-slotted system with N players in a distributed environment, each playing the same multi-armed bandit problem with M actions. In each time slot, every player simultaneously chooses an action for a random payoff. Sharing information among players can greatly expedite the exploration component for this multi-armed bandit problem in a distributed system. Each player, though still facing the exploration-exploitation trade-off, can benefit from the information shared by other players to infer statistical properties of the actions. This additional information can help each player to make better decisions, leading to a decrease in regret. However, information sharing raises the issue of cooperative exploration between players. In addition, it also incurs a communication cost, which needs to be managed at an acceptable level. To this end, illustrative embodiments characterize information sharing from the perspective of communication cost for the network when players send their individual observations to others from time to time.

Specifically, each player can observe his own rewards and actions, but cannot observe the information from other players. We refer to this as the "no monitoring" scenario. Thus in the no monitoring scenario, players must communicate to share information, which incurs a cost. One example of this case is in advertisement optimization on web-pages, where web-page requests are routed to one of the N servers (N computing nodes) upon arrival, and one out of M ads needs to be placed on a web-page for each server (M decision candidates). Since these web servers can be hosted across multiple data centers that are geographically separated, frequent communication is not desirable. To this end, characterizing the fundamental lower bound for the communication cost provides guidance in engineering the information sharing infrastructure. Specifically, we are interested in the communication cost defined by the number of communication rounds, and the conditions under which the lower bound can be achieved. We show a weak necessity for a logarithmic communication cost. For *Bernoulli* arrivals, we specify a policy that achieves the optimal regret and logarithmic communication cost over time.

More particularly, for the no monitoring setting with communication costs, we show that a regret improvement of 1/N can be achieved with a communication overhead of $O(\log(t))$ by a randomized policy. Further, we establish $O(\log(t))$ communication cost as a weak necessary condition for the 1/N regret improvement. Our results are established for a general *Bernoulli* arrival process and a general network structure for the N players.

FIG. 1 illustrates a computing network 100 in which illustrative embodiments of the invention can be implemented. As shown, computing network 100 comprises a plurality of computing nodes 102-1, 102-2, ..., 102-N. In the MAB scenario described above, each computing node is considered a player. The computing nodes are remote (e.g., geographically, physically or otherwise) from one another and are in communication with one another through communication network 104. Communication network 104 may employ any suitable communication protocol that allows for the sharing of information between the computing nodes 102.

One example of a sequential decision making application that may be implemented via the computing nodes in FIG. 1 is an electronic commerce (e-commerce) application where one or more product items are recommended to online shoppers that are served by different servers that are at different physical locations. Because of communication delay/cost, geographically distributed servers cannot easily cooperate, unless necessary. However, it is realized that online shopper requests have similar statistics in terms of their preferences (e.g., interests, tendencies, etc.). Learned information can be shared among different servers. But due to high performance requirements of the e-commerce application, only limited information can be communicated between the servers. The goal of the e-commerce application is that the items the servers choose to recommend are bought by the online shoppers as often as possible. This results in more revenue (more reward and less regret) for the entity operating the e-commerce site. Thus, the e-commerce application seeks to maximize the total revenue from all of the distributed servers.

In the e-commerce example, each computing node (in this example, each e-commerce server) selects a product recommendation from a set of product recommendation candidates in response to arrival of an online shopper request. As explained above, the e-commerce application wishes to maximize the number of times that the recommended (selected) product is purchased by the shopper. In accordance with illustrative embodiments, this revenue or reward is maximized by using information, including decisions made and rewards achieved by neighboring computing nodes in the network, while minimizing the amount of communication between the subject computing node and the neighboring nodes.

By way of another example, illustrative embodiments may be implemented with applications for distributed parameter tuning of machine learning algorithms, configuration tuning in a multi-tenant system (e.g., hadoop cluster, multiple cloud environment, data center), etc. The performance of each parameter configuration is unknown and each machine (N computing node) in the cluster must experiment with different configurations (M decision candidates) in the fastest possible way to choose the optimal configuration, whereby the optimal configuration achieves optimal performance (reward/revenue). This distributed parameter tuning problem can be modeled as a distributed sequential decision problem as described above.

Accordingly, illustrative embodiments provide a method to communicate between different nodes while incurring a logarithmic communication cost over time. This is also valid for asynchronous implementation of the sequential decision problem across different nodes and a general network structure. It is to be appreciated that embodiments are not limited to the e-commerce or parameter tuning examples given above but are more generally applicable to any distributed decision-based application.

Figure 2:
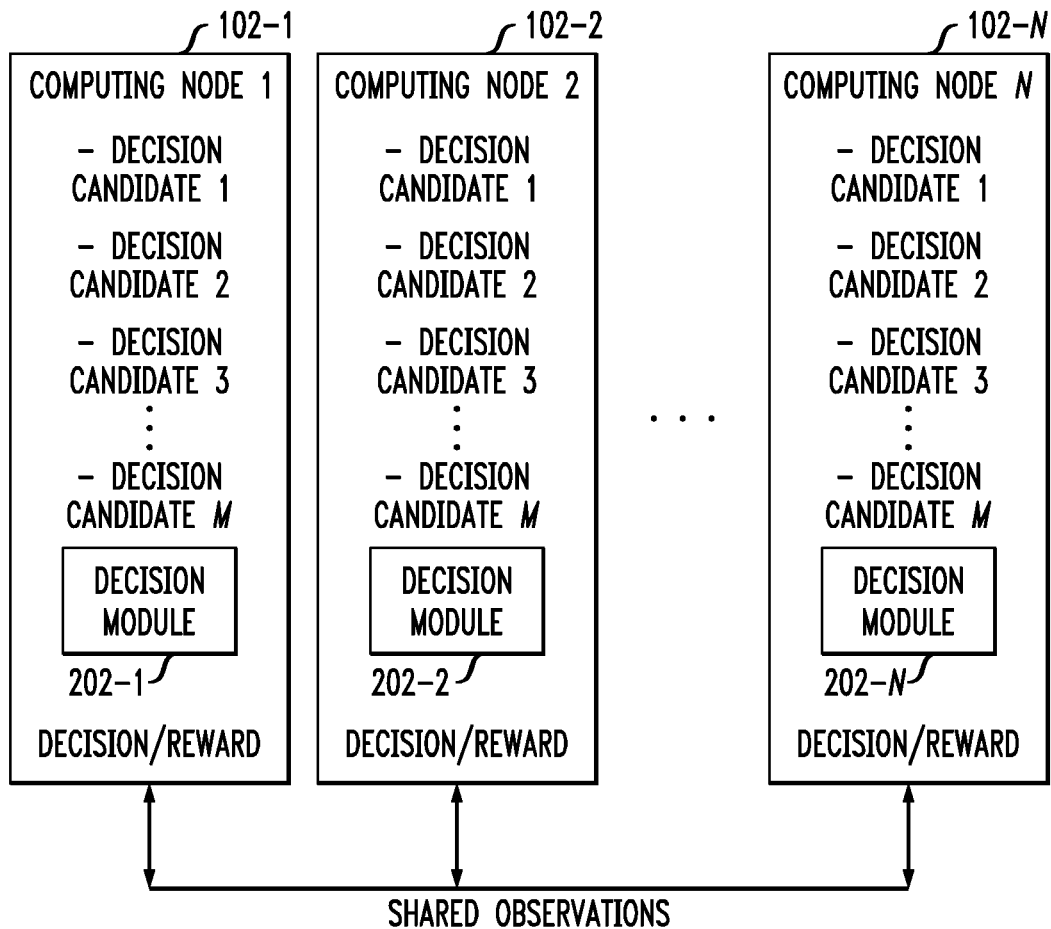
FIG. 2 illustrates details of computing nodes in a computing network according to an embodiment of the invention.

FIG. 2 illustrates details of computing nodes in a computing network according to an embodiment of the invention. As shown in example 200, the computing nodes 102-1, 102-2, ..., 102-N each comprise a decision module 202 (202-1, 202-2, ..., 202-N) which select a decision candidate from a plurality of decision candidates M based on a policy. The policy employed by each computing node takes into account decisions/rewards information (shared observations) from neighboring computing nodes. The decision candidates (actions) depend on the particular application being modeled by the sequential decision problem, e.g., a plurality of product recommendations, a plurality of system parameter configurations, etc. The decision module for a given computing node thus receives shared information from neighboring computing nodes, executes the decision making policy, determines the information to share with neighboring computing nodes, and shares the information.

As will be explained in further detail below, in one illustrative embodiment, a novel epsilon ($\epsilon$) greedy policy (for the purpose of distributed implementation) is provided and applied in the following way. At each time, for each player (computing node), a parameter epsilon (which is a function of time and player position in the network) is chosen. The player communicates with neighbors only with a probability epsilon. Epsilon can be chosen to decrease with time in such a way as to ensure suitable performance as well as a logarithmic communication cost.

Figure 3:
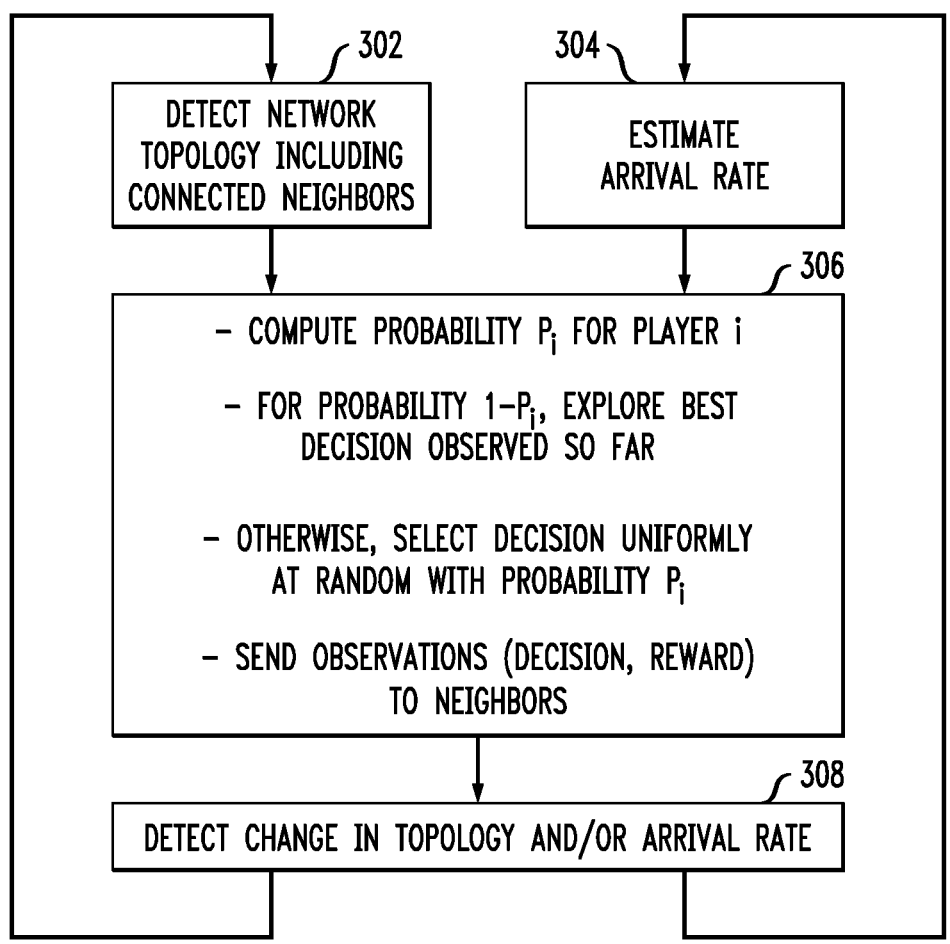
FIG. 3 illustrates a methodology for decision making and information sharing in a computing network according to an embodiment of the invention.

FIG. 3 illustrates a methodology 300 for sequential decision making and information sharing in a computing network according to an embodiment of the invention. It is to be appreciated that each decision module 202 in each computing node 102 performs methodology 300. The steps below are generalized for a given one of the computing nodes (i.e., player i), meaning that each computing node performs methodology 300.

As shown, in step 302, the decision module 202 detects the topology of the network in which the given computing node is operating. That is, the decision module of the given computing node finds out its neighboring nodes with which it will share information. Network topology detection can be performed in a variety of standard ways including, but not limited to, broadcasting ping, recursively using Simple Network Management Protocol (SNMP) queries to download routing tables, etc.

In step 304, the decision module 202 estimates an arrival rate. By arrival rate, it is meant the rate at which a request that triggers the need to make a decision is received. Estimating the arrival rate and detecting the change of the arrival rate can rely on standard approaches and technologies. By way of example only, one approach is to use the average number of requests that arrived during a preceding (e.g., immediately preceding) time window of fixed length. If the average numbers measured from two consecutive time windows are larger than a threshold, it indicates that the arrival rate has changed. In addition to the simple average over a time window, exponential moving average is another way to estimate the average inter-arrival times. The arrival rate is equal to the reciprocal of the estimated inter-arrival time. Alternatively, more complex approaches may be employed.

In step 306, the decision module 202 implements the decision policy. An example of the decision policy is shown in algorithm 400 of FIG. 4, which will be explained in further detail below. As shown in step 306 of methodology 300, the decision module computes a probability $P_i$ based on the number of neighboring nodes determined in step 302 and the estimated arrival rate determined in step 304. The decision module uses probability $P_i$ to conduct a randomized decision control procedure as follows. With probability $1-P_i$, the decision module selects the decision (from the plurality of decision candidates) that so far yields the best average reward. Otherwise (i.e., if the decision module does not select the decision that so far yields the best average reward), the decision module selects a decision (from the plurality of decision candidates) uniformly at random with probability $P_i$. The decision module sends the decision and reward attributable to the selected decision to its neighboring nodes.

In step 308, the decision module 202 detects any changes in the network topology and/or the arrival rate of requests. These changes, if any, are taken into account for a subsequent iteration of the methodology 300. If the topology and arrival rates remain the same, the methodology repeats the decision control procedure of step 306 until complete; otherwise, in a dynamic environment, steps 302 through 306 are repeated until complete.

FIG. 4 illustrates an algorithm 400 for use in the methodology of FIG. 3. More specifically, algorithm 400 is employed as step 306 in methodology 300 described above.

Before describing algorithm 400, we first formally define the N-player M-armed bandit problem that algorithm 400 solves in accordance with an illustrative embodiment. Embodiments are not necessarily limited to this formal definition.

Let $\mathcal{N}=\{1, \ldots, N\}$ denote the set of players in the system (i.e., given computing network) and $\mathcal{M}=\{1, \ldots, M\}$ the set of actions. Note that all players have the same set of actions. A player i chooses an action $a \in \mathcal{M}$ time t, with the payoff/reward denoted by $X_{ia}(t)$. The random variable $X_{ia}(t)$ has an unknown probability distribution $F_a$ with the univariate density function $f(x; \theta_a)$, where $f(\cdot; \cdot)$ is known but the parameters $\theta_a$ are unknown. Let $\mu_a$ be the mean of the random variable $X_{ia}(t)$ for all i. We assume that $\{X_{ia}(t), \forall i \in \mathcal{N}, \forall a \in \mathcal{M}, t \geq 0\}$ are independent for each i, a and t. Furthermore, the distributions $F_{ai}$ have a bounded support of [0,1] for each i and a. For example, *Bernoulli* distribution models the setting of advertising to players where $X_{ia}(t)=1$ corresponds to a click on the advertisement from category a for player i.

An allocation strategy (also called a policy) $\phi$ specifies the action chosen by each player at each time in the system. Formally, $\phi$ is a sequence of random variables $\{\phi_i(t), \forall i \in \mathcal{N}, t \geq 0\}$, where $\phi_i(t) \in \mathcal{M}$ is the action chosen by player i at time t. Let $Y_i(t)$ be the reward obtained by the strategy $\phi$ for player i at time t. Let the history $\{\phi_i(k), Y_i(k), \forall i \in \mathcal{N}, k \leq t-1\}$ be denoted by $\mathcal{H}^t$. Then, the event $\{\phi_i(t)=a\}$ belongs to the $\sigma$-field generated by $\mathcal{H}^t$, implying that it does not depend on the observations at time t.

Let $T_{ia}^\phi(t)$ be the total number of times action a is chosen by player i up to the time t under strategy $\phi$. Let $S_a^\phi(t)$ be the total number of times to choose action a in the system. Then, $S_a^\phi(t) = \sum_{i=1}^N T_{ia}^\phi(t)$.

The regret of strategy $\phi$ at time t for a fixed $\mu=(\mu_1, \ldots, \mu_M)$ is defined by $$R_\mu^\phi(t) = \mu^* N t - \sum_{i=1}^N \sum_{a=1}^M \mu_a \mathbb{E}[T_{ia}^\phi(t)],$$

$$= \sum_{a=1}^M (\mu^* - \mu_a) \mathbb{E}[S_a^\phi(t)],$$

where $$\mu^* = \max_{a \in \mathcal{M}} \mu_a.$$

Let $\Delta_a = \mu^* - \mu_a$. For player i, the regret can be defined as follows:

$$R_\mu^{\phi,i}(t) = \mu^* t - \sum_{a=1}^M \mu_a \mathbb{E}[T_{ia}^\phi(t)].$$

We also restrict to the class of uniformly good strategies that are defined below.

Uniformly good strategies: An allocation rule $\phi$ is said to be uniformly good if for every fixed $\mu$, the following condition is satisfied as $t \to \infty$:

$$R_\mu(t) = o(t^b) \text{ for every } b > 0.$$

The above condition implies that uniformly good strategies achieve the optimal long term average reward of $N\mu^*$ for the system.

Returning now to FIG. 4, algorithm 400 assumes a general arrival model. Player i (computing node or decision module i) receives a request at time t with probability $\lambda_i$. These arrival probabilities are common information to all players. Upon receiving a request, each player must choose an action from the set M. The payoffs and actions of each player are not visible to others. Players must communicate with each other in order to get a speedup in regret performance. More specifically, algorithm 400 is as follows:

Input: $c>0, 0<d<1, 0 \leq z_i \leq 1$.

For each time t, upon receiving a request do
Let $$\epsilon_t(t) = \min\left(1, \frac{cMz_i}{d^2 t}\right).$$

Let $$a_i^* = \arg\max_{a \in M} \bar{x}_{ia}(t),$$

Where $\bar{x}_{ia}(t)$ is the sample mean of observations available for action a for player i up to time t.

Choose μ uniformly at random from [0,1].

If u≤(1−γ$_i$(t): pick action φ$_i$(t)=$a_i^*$

Else, pick action φ$_i$(t) uniformly at random from $\mathcal{M}$ and communicate the reward and action to all other players. Update sample means $\bar{x}_{ia}$(t+1) according to the received/communicated rewards.

end for

Algorithm 400 is a randomized policy that takes this into account. The policy is a ϵ-greedy policy where ϵ is the probability (referred to as P$_i$ above in the context of FIG. 3). The exploration component of the policy is proportional to (1/time). However, the policy has an element of exploration for each player at a rate proportional to the player's arrival rate relative to the net arrival rate in the network. Further, players only communicate in the exploration phase.

The policy consists of two phases for each player: exploitation and exploration. For each player i, choose ϵ$_i$(t) proportional to z$_i$=t; where z is such that Σ$_i$λ$_i$z$_i$=1. Player i explores a randomly chosen action with probability ϵ$_i$(t) and communicates the obtained reward and action information to all other players. Player i exploits the action with the highest sample mean with probability 1−ϵ$_i$(t). Since the exploration is guaranteed to be O(log(t)) for the network, communication cost is also O(N log(t)) as shown in the following statement.

Statement 1. Choose $$0 < d < \min_{a \in \mathcal{U}} (\mu^* - \mu_a) \text{ and } c > \max_N (4\alpha(4\alpha-1)d^2/3(\alpha-1)^2, 2\alpha)$$

for any α>1. Let $$\sum_{i=1}^{N} \lambda_i z_i = 1.$$

Then, the regret of the whole system when each player follows the strategy in algorithm 400 is at most $$\frac{c}{d^2} \sum_a (\mu^* - \mu_a)\log(t) + O\left(\sum_i \lambda_i\right).$$

Also, the regret of each player i is at most $$\frac{c\lambda_i z_i}{d^2} \sum_a (\mu^* - \mu_a)\log(t) + O(\lambda_i).$$

The communication cost of this scheme is also at most O(N log (t)).

Further, we present a weak necessary condition on the communication cost in the next statement.

Statement 2. Suppose the communication cost of a scheme is at most o(log(t)). Then, the regret of the whole system is at least Ω(log(t))+Ng(t), where g(t)→∞ as t→∞.

The ϵ$_t$-greedy policy is also applicable in a general network model setting. Consider the scenario where players are embedded in a network and can only communicate with neighboring nodes. Suppose the network structure is known to all users. Each player updates its sample mean estimates from observations received from its neighbors. In turn, each player only communicates its observations in exploration phase to all its neighbors in the network. We assume that the players share only observations rather than sample mean estimates every time.

Let $\mathcal{N}_i$ be the neighbors of player i (including i). Consider the following linear program P:

$$P: \min \sum_{i \in \mathcal{N}} \lambda_i z_i$$

$$\text{subject to } \sum_{j \in \mathcal{N}_i} \lambda_j z_j \geq 1, \forall i \in \mathcal{N},$$

$$\text{and } z_i \geq 0, \forall i \in \mathcal{N}.$$

Let ($z_i^*$)i be the optimal solution of the above linear program (LP). We can now use $z_i^*$ as an input for each player in the ϵ$_t$-greedy policy in algorithm 400 so that ϵ$_i$(t) is proportional to $z_i^*$/t. The following statement provides regret guarantees of such a policy for a general network model.

Statement 3. Choose $$0 < d < \min_{a \in \mathcal{U}} (\mu^* - \mu_a)$$

and c>max(4α(4α−1)d²/3(α−1)², 2α) for any α>1. Let ($z_i^*$)i be optimal solution of LP P. Then, the regret of the whole system when each player follows the strategy in algorithm 400 is at most $$\frac{c}{d^2} \sum_i \lambda_i z_i^* \sum_a (\mu^* - \mu_a)\log(t) + O\left(\sum_i \lambda_i\right).$$

Also, the regret of each player i is at most $$\frac{c\lambda_i z_i^*}{d^2} \sum_a (\mu^* - \mu_a)\log(t) + O(\lambda_i).$$

The communication cost of this scheme is also at most O(N log (t)).

It is to be understood that statement 1 is a special case of statement 3 when the network is a complete graph ($N_i$=N in this case).

Figure 5:
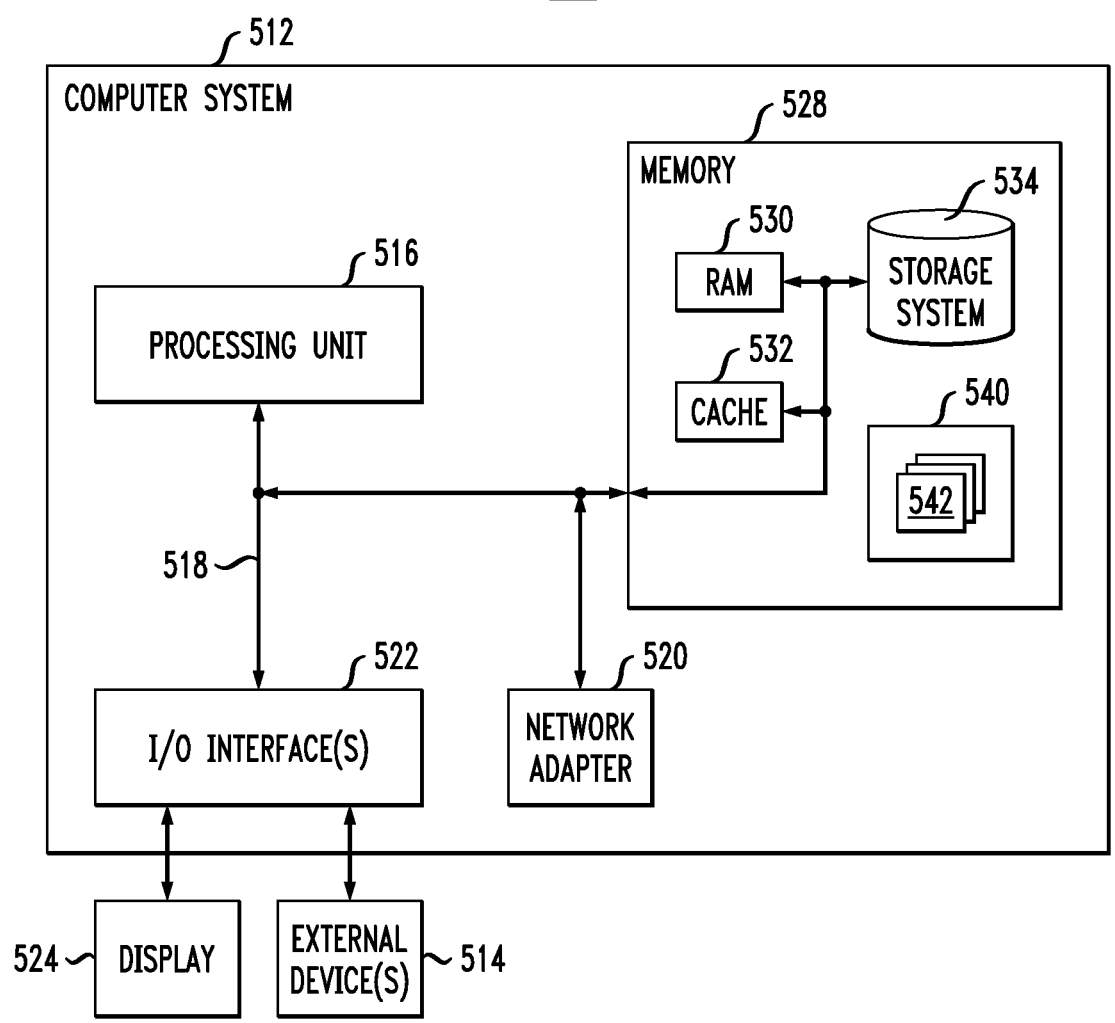
FIG. 5 illustrates a computing platform for a computing node according to an embodiment of the invention.

FIG. 5 illustrates a computing platform for a computing node according to an embodiment of the invention. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 5, a schematic of an example of a computing node is shown. Computing node 500 is only one example of a suitable computing node and is not intended to suggest any limitation as to the scope of use or functionality of embodiments of the invention described herein. Regardless, computing node 500 is capable of being implemented and/or performing any of the functionality set forth hereinabove.

One or more embodiments can make use of software running on a general-purpose computer or workstation. In computing node 500 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 500 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via input/output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
    estimating a request arrival rate at a given computing node in a computing network comprising a plurality of distributed computing nodes, wherein the request arrival rate is a rate at which a request triggers a decision selection;
    determining a topology of the computing network at the given computing node so as to identify neighboring computing nodes with respect to the given computing node;
    computing a probability at the given computing node based on the estimated request arrival rate and the detected network topology to select a decision from a set of decision candidates in response to a request received at the given computing node in a given time slot, wherein the selected decision has a top average reward attributed thereto across the given computing node and the neighboring computing nodes determined based on information shared by the neighboring computing node with the given computing node, and wherein the decision is selected based on the estimated arrival rate selective to a net arrival rate in the computing network;
    test the decision from the set of decision candidates in response to the request received at the given computing node in the given time slot;
    sending the selected decision and reward attributable thereto from the given computing node to the neighboring computing nodes;
    detecting a change to the detected network topology; and
    re-computing the probability based on the detected change;
    wherein the computing node comprises a processor and memory configured to execute one or more of the above steps.

2. The method of claim 1, wherein the given computing node uniformly at random tests the decision from the set of decision candidates in response to the request received at the given computing node in the given time slot.

3. The method of claim 1, further comprising detecting a change to the estimated request arrival rate.

4. The method of claim 1, wherein the step of using the computed probability to select the decision from a set of decision candidates in response to a request received at the given computing node in a given time slot further comprises selecting the decision with one minus the probability.

5. The method of claim 1, wherein the step of computing the probability at the given computing node based on the estimated request arrival rate and the detected network topology further comprises representing the probability computation as a linear program and determining an optimal solution to the linear program.

6. The method of claim 5, wherein the linear program representation provides for a logarithmic cost associated with communication between the given computing node and the neighboring computing nodes.

7. The method of claim 1, wherein the plurality of computing nodes comprises a plurality of distributed servers in a revenue-based application.

8. The method of claim 1, wherein the plurality of computing nodes comprises a plurality of distributed machines in a parameter tuning-based application.

9. An apparatus, comprising:
a processor operatively coupled to a memory to form a given computing node in a computing network comprising a plurality of distributed computing nodes, the processor being configured to:
estimate a request arrival rate at the given computing node, wherein the request arrival rate is a rate at which a request triggers a decision selection;
determine a topology of the computing network at the given computing node so as to identify neighboring computing nodes with respect to the given computing node;
compute a probability at the given computing node based on the estimated request arrival rate and the detected network topology to select a decision from a set of decision candidates in response to a request received at the given computing node in a given time slot, wherein the selected decision has a top average reward attributed thereto across the given computing node and the neighboring computing nodes determined based on information shared by the neighboring computing node with the given computing node, and wherein the decision is selected based on the estimated arrival rate selective to a net arrival rate in the computing network;
test the decision from the set of decision candidates in response to the request received at the given computing node in the given time slot;
send the selected decision and reward attributable thereto from the given computing node to the neighboring computing nodes;
detecting a change to the detected network topology; and
re-computing the probability based on the detected change.

10. The apparatus of claim 9, wherein the processor is further configured to uniformly at random test the decision from the set of decision candidates in response to the request received at the given computing node in the given time slot.

11. The apparatus of claim 9, wherein the processor is further configured to detect a change to the estimated request arrival rate.

12. The apparatus of claim 9, wherein the using of the computed probability to select the decision from a set of decision candidates in response to a request received at the given computing node in a given time slot further comprises selecting the decision with one minus the probability.

13. The apparatus of claim 9, wherein the computing of the probability at the given computing node based on the estimated request arrival rate and the detected network topology further comprises representing the probability computation as a linear program and determining an optimal solution to the linear program, wherein the linear program representation provides for a logarithmic cost associated with communication between the given computing node and the neighboring computing nodes.

14. The apparatus of claim 9, wherein the plurality of computing nodes comprises a plurality of distributed servers in a revenue-based application or a plurality of distributed machines in a parameter tuning-based application.

15. An article of manufacture, comprising a non-transitory computer readable storage medium having tangibly embodied thereon computer readable program code which, when executed, causes a processor to:
estimate a request arrival rate at the given computing node, wherein the request arrival rate is a rate at which a request triggers a decision selection;
determine a topology of the computing network at the given computing node so as to identify neighboring computing nodes with respect to the given computing node;
compute a probability at the given computing node based on the estimated request arrival rate and the detected network topology to select a decision from a set of decision candidates in response to a request received at the given computing node in a given time slot, wherein the selected decision has a top average reward attributed thereto across the given computing node and the neighboring computing nodes determined based on information shared by the neighboring computing node with the given computing node, and wherein the decision is selected based on the estimated arrival rate selective to a net arrival rate in the computing network;
test the decision from the set of decision candidates in response to the request received at the given computing node in the given time slot;
send the selected decision and reward attributable thereto from the given computing node to the neighboring computing nodes;
detecting a change to the detected network topology; and
re-computing the probability based on the detected change.

16. The article of manufacture of claim 15, wherein the given computing node uniformly at random tests the decision from the set of decision candidates in response to the request received at the given computing node in the given time slot.

17. The article of manufacture of claim 15, wherein the processor further detects a change to the estimated request arrival rate.

18. The article of manufacture of claim 15, wherein using the computed probability to select the decision from a set of decision candidates in response to a request received at the given computing node in a given time slot further comprises selecting the decision with one minus the probability.

19. The article of manufacture of claim 15, wherein computing the probability at the given computing node based on the estimated request arrival rate and the detected network topology further comprises representing the probability computation as a linear program and determining an optimal solution to the linear program.

20. The article of manufacture of claim 15, wherein the plurality of computing nodes comprises a plurality of distributed servers in a revenue-based application.

* * * * *